United States Patent [19]
Jang et al.

[11] Patent Number: 5,889,067
[45] Date of Patent: Mar. 30, 1999

[54] OPEN CELL RIGID POLYURETHANE FOAM AND METHOD FOR PRODUCING THE SAME AND METHOD FOR MAKING VACUUM INSULATION PANEL USING SAME

[75] Inventors: Mi-seon Jang, Seoul; Jin-taek Hwang; Seung-joo Seo, both of Daejun, all of Rep. of Korea

[73] Assignee: Samsung Electronics Co., Ltd., Suwon, Rep. of Korea

[21] Appl. No.: 65,693

[22] Filed: Apr. 24, 1998

[30] Foreign Application Priority Data

Apr. 26, 1997 [KR] Rep. of Korea ............... 1997 15717

[51] Int. Cl.[6] .................... C08G 18/30; C08G 18/32
[52] U.S. Cl. .................... 521/117; 521/128; 521/129; 521/131; 521/174
[58] Field of Search .................... 521/174, 131, 521/128, 129, 117

[56] References Cited

U.S. PATENT DOCUMENTS

| | | | |
|---|---|---|---|
| 4,797,430 | 1/1989 | Haas et al. | 521/157 |
| 4,950,694 | 8/1990 | Hager | 521/176 |
| 5,350,777 | 9/1994 | Yuge et al. | 521/174 |
| 5,457,138 | 10/1995 | Yug et al. | 521/139 |
| 5,575,871 | 11/1996 | Ryoshi | 521/174 |
| 5,690,855 | 11/1997 | Nichols et al. | 521/130 |

*Primary Examiner*—Morton Foelak
*Attorney, Agent, or Firm*—Larson & Taylor

[57] ABSTRACT

Disclosed is a method for producing an open cell rigid polyurethane foam which comprises reacting the mixture of a polyol for producing rigid polyurethane foam, a volatile blowing agent which is free from environmental pollution and selected from the group consisting of hydrocarbons, hydrofluoroalkanes and perfluoroalkanes or a mixture of the volatile blowing agent with water, a monohydric fatty alcohol having a good solubility to hydrocarbon as a cell opening agent, a foam stabilizer forming a very small cell in the presence of a isocyanate trimer catalyst and an organic isocyanate. The resultant open cell rigid polyurethane foam has a cell size of about less than 95 um, and is suitable for use, for example, as a core material in a vacuum heat insulating material. The foam may be enclosed in a container under a vacuum of 0.1~0.01 torr and has a thermal conductivity of 0.0045~0.0050 kcal/mhr°C.

13 Claims, No Drawings

OPEN CELL RIGID POLYURETHANE FOAM AND METHOD FOR PRODUCING THE SAME AND METHOD FOR MAKING VACUUM INSULATION PANEL USING SAME

BACKGROUND OF THE INVENTION

1. Field of the Invention

The present invention relates to an open cell rigid polyurethane foam and a method for producing the same, which foam prevents environmental pollution when used as heat insulators in the production of home and industrial refrigerators, and in the assembly of low temperature warehouses and the like. The invention also relates to a method for making a vacuum insulation panel using open cell rigid polyurethane foam.

2. Description of the Related Art

Recently, refrigerator manufacturers confront two problems: 1) the restriction of use of CFC which causes environmental pollution, and 2) energy saving. To solve the former problem, refrigerator manufacturers in Europe usually use cyclopentane as a blowing agent. Although cyclopentane does not destroy the ozone layer, it has a low insulation efficiency and refrigerator manufacturers in the U.S.A. more than likely will begin using a hydrofluorocarbon as a substitute blowing agent around 2003. To solve the latter problem, refrigerator manufacturers in both Japan and Europe try to save energy by applying vacuum heat insulators to refrigerators.

Generally, vacuum heat insulators are classified into a silica filler type, an open cell rigid polyurethane foam type, and a glass fiber filler type according to a fulfilled core material. Use of the silica filler type is restricted because of the dust that results in its production process and its heavy weight. Use of the glass fiber filler type is restricted because of its high production cost. The weight of open cell rigid polyurethane foam type is about ⅓ of that of the silica filler type and its mass production is simple. Consequently, many refrigerator manufacturers are trying to use the open cell rigid polyurethane foam type as a vacuum heat insulator.

A vacuum heat insulator having reduced inner pressure for the purpose of improving heat insulation properties of a refrigerator insulator, is disclosed in Japanese Patent Application Laid-open No. 64-4112, and comprises a core material enclosed by a vacuum vessel, which is made of metal-laminate film. Such a vacuum heat insulation panel uses a 100% open cell rigid polyurethane foam as a core material, covered by a metal-laminate film, for forming a high vacuum, and reduces pressure to 0.05 torr in the inner part. So, vacuum heat insulation panels whose thermal conductivity is extremely improved to 0.0065 kcal/mhr°C. compared to the thermal conductivity of 0.015kcal/mhr°C. of the conventional rigid polyurethane foam have been developed.

In U.S. Pat. No. 5,350,777 to Matsushita Refrigeration Company, a substitute blowing agent is used instead of chlorofluorocarbons (CFCs), in the production of conventional 100% open cell polyurethane foam. They proposed HCFCs, hydrocarbon and perchloroalkane as a blowing agent. Actually, a divalent metal salt of saturated monocarbonic acid which was used as a cell opening agent, performed its role well because of its high solubility to CFCs or HCFCs; but, hydrocarbons such as a pentane, cyclopentane and perchlorocarbon are insoluble in CFCs and HCFCs. Consequently, foaming essential for small-sized open cell rigid polyurethane foam production was not possible.

SUMMARY OF THE INVENTION

It is, therefore, an object of the present invention to provide a small cell sized, environment-friendly 100% open cell rigid polyurethane foam and a method for its production. It is also an objection of the invention to provide a method of making a vacuum insulation panel by using the novel foam of the invention.

The above objects are achieved by an open cell rigid polyurethane foam comprising the reaction product of an organic isocyanate and a mixture comprising a polyol for producing rigid polyurethane foam, a volatile blowing agent free from environmental pollution, a foam stabilizer for cell opening and a cell opening agent in the presence of a polymerization catalyst. The resultant open cell rigid polyurethane foam has a cell size of about less than 95 um.

The novel open cell rigid polyurethane foam of the invention is produced by simply mixing a polyol for producing rigid polyurethane foam, a volatile blowing agent, a cell opening agent, a foam stabilizer for cell opening, and a foam stabilizer for producing rigid polyurethane foam to form a mixture; and reacting said mixture with organic isocyanate.

The vacuum insulation panels of the invention are prepared by wrapping the open cell rigid polyurethane foam of the invention and a gas absorber with a metal-laminate film and vacuum sealing it provide an insulating material having a thermal conductivity of about 0.0045~0.0050 kcal/mhr°C.

DETAILED DESCRIPTION OF THE INVENTION

In the present invention, a prepolymer obtained by the reaction of an organic polyisocyanate and a monohydric fatty alcohol, a polyol, a foam stabilizer, a cell opening agent and a blowing agent are used as raw materials. The foam stabilizer is used for the purpose of cell opening control of the open cell rigid polyurethane foam. Preferred foam stabilizers are silicon foam stabilizers such as are used in the production process of high elastic polyurethane foam. The foam stabilizers may be used in the range of 0.1~3.0 parts by weight in relation to 100 parts by weight of polyol used. The monohydric fatty alcohol may be used in the range of 0.5~5.0 parts by weight in relation to 100 parts by weight of polyol used and a cell opening agent may be used. For the purpose of cell size reduction, an open cell rigid polyurethane foam is used as a core material and a foam stabilizer is used in the production process of rigid polyurethane foam.

The cell size of the core material in the foam production process is smaller than that of the conventional open cell rigid polyurethane foam, and the cells in the core material easily blow up during the foaming process. Foamed foams of the core material contain a 100% content of open cell. So, a vacuum heat insulating panel can be obtained by covering this core material with high vacuum metal-laminate film, reducing the inner vacuum to 0.05 torr, and then heat adhering.

Moreover, even though the open cell rigid polyurethane foam of this present invention does not include closed cells at all, gas contained in the cell wall of the foam diffuses gradually over the long-term, and a very small amount of gas diffuses through an opening of heat adhering and metal-laminate film, so inner pressure increases and the insulation efficiency of the vacuum heat insulator is remarkably decreased. To solve the above-mentioned problem of inner pressure increase, the present invention uses an inorganic gas absorber, which absorbs diffused gas and maintains an inner vacuum condition for a long period (more than ten years).

The polyol used in this present invention can be the same kind of polyol used in the rigid polyurethane foam production process or it can be the addition product of alkyleneoxide and glycerin. A heat insulating material having good heat insulating properties is obtained by using an 100% open cell rigid polyurethane foam as a core material, wherein the open cell rigid polyurethane foam is obtained by the reaction of a polyol having more than an 80 weight percent of polyol content and a hydroxy value of 200~350 mg KOH/g, a prepolymer, a blowing agent in the presence of a catalyst, a foam stabilizer and a cell opening agent.

In the present invention, two kinds of mixed foam stabilizers are used preferably in the production process of the open cell rigid polyurethane foam of the invention. One is that used in the production process of rigid polyurethane foam for the purpose of obtaining a small cell sized and an 100% open cell, and the other is that used in the production process of high elastic soft and semi-rigid polyurethane foam for the purpose of obtaining very excellent cell opening properties. For example, foam stabilizers of B-6480, B-6462, B-8566 and so on of the Gold-Schimidt Company are good for obtaining small cell sized rigid polyurethane foam. These foam stabilizers may be used in the range of 0.1~5.0 parts by weight in relation to 100 parts by weight of polyol used, more preferably, from an economic point of view, these foam stabilizer may be used in the range of 0.5~2.0 parts by weight in relation to 100 parts by weight of polyol used.

The cell opening agent used in this present invention is monohydric fatty alcohol that is very soluble in hydrocarbons and is insensitive to formulation change during the production processing of the foam. The preferred monohydric alcohols contain two to eight carbons and include, for instance, alkanols such as 1-butanol, a 1-pentanol, a 1-hexanol. The cell opening agent is used in this present invention in the range of 0.1~5.0 parts by weight in relation to 100 parts by weight of polyol used.

The organic isocyanate is preferably a prepolymer obtained by the reaction of a polymethylene polyphenyl polyisocynate and a monohydric fatty alcohol. For example, the monohydric fatty alcohol can be a monohydric fatty alcohol of less than eight carbons or a monoalkyl ether of glycol. In the present invention, diethylene glycol, triethylene glycol and polyethylene glycol having a molecular weight of less than 500 are mainly used as a polyethylene glycol, and, methyl or ethyl radicals are used as an alkyl radical.

The NCO % of the prepolymer normally falls within about 25~28%, and the amount of prepolymer employed has a isocyanate index of 130~300 compared to water contained polyol. More preferably, as regards cell size, the isocyanate index of 170~230 is effective for obtaining a small sized cell.

Moreover, in the present invention, the diisocyanate trimer reaction solves the decrease of compression strength which is caused by blowing up of rigid polyurethane foam. Catalysts used in the isocyanate trimer reaction are preferably isocyanurating catalysts which include a metal salt of organic carbonic acid, a tertiary amine compound and a quaternary salt of ammonium, such as DABCO K-15, DABCO TMR-30 and POLYCAT-46 (they are product names of the Air Product Co.). Above mentioned catalysts may be used in the isocyanate trimer reaction in the range of 0.5~5.0 parts by weight in relation to 100 parts by weight of polyol used. And such catalysts may be used singly or in admixture conventional amine catalysts used in the production of polyurethane foam.

In the meantime, the environmental pollution free substitute for CFC and HCFC used as a volatile blowing agent according to this present invention includes hydrocarbons, hydrofluorocarbon, and perchloroalkanes. The hydrocarbons are cyclopentane, pentanes, and alkane of two to four carbons. Suitable hydrofluorocarbons are those of two to four carbons such as 1,1,1,2,-tetrafluoroethane; 1,1,2,2,3-pentafluoropropane; 1,1,1,2,3,3-hexafluoropropane; 1,1,1,4,4,4-hexafluorobutane; and perchloroalkanes of four to six carbons and more than one fluorine, such as perfluoropentane and perfluorohexane.

If desired, a small amount of water as a chemical blowing agent, which generates carbon dioxide by the reaction with the organic isocyanate may be used together with the volatile blowing agent mentioned above.

Preferably, the amount of blowing agent and water used falls in the range of 5~20 parts and 0.5~5.0 parts by weight, respectively in relation to 100 parts by weight of polyol used.

The perchloroalkane used as a volatile blowing agent is expensive, but it also works as a nuclear agent at the same time, so 1~10 parts of the perchloroalkane may be used by weight in relation to 100 parts by weight of polyol used. Preferably, considering cell size and economy, 1~5 parts of the perchloroalkane may be used by weight in relation to 100 parts by weight of polyol used.

A small cell sized and uniform open cell rigid polyurethane foam may be obtained by premixing the above mentioned raw materials except for the prepolymer and subjecting same to a high pressure foaming process.

As above mentioned, the raw materials used in the production of rigid polyurethane foam in the present invention include a prepolymer, a polyol, a foam stabilizer, a cell opening agent and a blowing agent in the presence of a catalyst. Moreover, the rigid polyurethane foam being made from the mixture of the silicon foam stabilizer for cell opening, the blowing agent, and the cell opening agent of an aliphatic monohydric alcohol has a cell openness of 100% according to easy bursting of the cell wall in the foaming process and a small solid thermal conductivity of cell structure. In the above mentioned case, the silicon foam stabilizer used in the production process of the high elastic polyurethane foam may be used in the range of 0.1~5.0 parts by weight in relation to 100 parts of polyol used.

Thus, a heat insulating material having a low thermal conductivity may be obtained employing a pressure of about 0.1~0.01 torr. The heat insulating material is composed of a foam core material and a gas absorber wrapped with metal-laminate film and vacuum ventilated for the purpose of reducing inner pressure.

This present invention will now be described in more detail with reference to examples and reference examples, however, this present invention is not limited thereto.

EXAMPLES 1 to 6

The materials used in these examples and reference examples 1 to 6 are as follows:

| | |
|---|---|
| Polyether polyol | Addition product of alkylene oxide to glycerin and having a hydroxyl value of 300 mg KOH/g (Kumho Chemical Inc.) |
| Catalyst | Polycat 46 (Air Product Co.) |
| Silicon foam stabilizer A | B-8929 (TG. Gold-Schimidt Co.) |
| Silicon foam stabilizer B | B-8960 (TG. Gold-Schimidt Co.) |
| Silicon foam stabilizer C | B-8961 (TG. Gold-Schimidt Co.) |
| Silicon foam stabilizer D | B-8462 (TG. Gold-Schimidt Co.) |
| Blowing agent A | Water |

-continued

| | |
|---|---|
| Blowing agent B | Cyclopentane |
| Nuclear agent | Perfluorohexane (3M) |
| Cell opening agent | 1-Butanol |
| Polyisocyanate | Prepolymer obtained by the reaction of pMDI and triethyleneglycol monomethylether, having an 25% of NCO% |

In here, pMDI means polymethylene polyphenyl polyisocyanate.

The materials as indicated in Table 1 were mixed together at 20° C. and reacted to form an open cell rigid polyurethane foam in a wooden mold of 250 mm cube using a high pressure foaming machine. The following day the resultant foam was cut to measure the cell size based on SEM (Scanning Electromicro Photographs). The results are indicated in Table 1. The viscosity of the polyisocyanate used at 25° C. is measured by a Brookfield viscometer.

The resultant open cell polyurethane foam was heated for about 10 minutes at 150° C. by using a dryer to remove moisture and unreacted materials therefrom, and then enclosed with a gas absorber in a 100 um thick metal-laminate film composed of a polyether, a polyethylene and an aluminum under vacuum of 0.05 torr, thereby to provide a vacuum heat insulating material. The thermal conductivity of the vacuum heat insulating material is indicated in Table 1.

TABLE 1

The formulation and properties of the open cell rigid polyurethane foam and properties of a vacuum heat insulating panel.

| | | EXAMPLES | | | | | |
|---|---|---|---|---|---|---|---|
| | | 1 | 2 | 3 | 4 | 5 | 6 |
| Formulation (Parts by weight) | Polyether polyol | 100 | 100 | 100 | 100 | 100 | 100 |
| | Catalyst | 0.9 | 0.9 | 0.9 | 0.9 | 0.9 | 0.9 |
| | Silicon foam stabilizer A | 1.4 | — | — | 1.4 | — | — |
| | Silicon foam stabilizer B | — | 1.4 | — | — | 1.4 | — |
| | Silicon foam stabilizer C | — | — | 1.4 | — | — | 1.4 |
| | Silicon foam stabilizer D | 1.0 | 1.0 | 1.0 | 1.0 | 1.0 | 1.0 |
| | Blowing agent A | 1.5 | 1.5 | 1.5 | 1.5 | 1.5 | 1.5 |
| | Blowing agent B | 6.0 | 6.0 | 6.0 | 6.0 | 6.0 | 6.0 |
| | Nuclear agent | 4.0 | 4.0 | 4.0 | 4.0 | 4.0 | 4.0 |
| | Cell opening agent | 2.0 | 2.0 | 2.0 | 2.0 | 2.0 | 2.0 |
| | Polyisocyanate | 200 | 200 | 200 | 200 | 200 | 200 |
| | Isocyanate index | 170 | 170 | 170 | 210 | 210 | 210 |
| Properties of foam | Density (kg/m$^3$) | 53 | 53 | 53 | 55 | 55 | 55 |
| | Cell size (um) | 90 | 92 | 95 | 93 | 92 | 90 |
| | Cell openness (%) | 100 | 100 | 100 | 100 | 100 | 100 |
| Insulation efficiency of vacuum heat insulating material | Initial thermal conductivity (10$^{-4}$ kcal/mhr ° C.) | 45 | 47 | 50 | 48 | 47 | 46 |
| | Thermal conductivity after 30 days (10$^{-4}$ kcal/mhr ° C.) | 45 | 47 | 50 | 48 | 47 | 46 |

REFERENCE EXAMPLES 1 to 3

The materials used in these reference samples 1 to 3 are as follows:

| | |
|---|---|
| Polyether polyol | Addition product of alkylene oxide to glycerin and having a hydroxyl value of 300 mg KOH/g (Kumho Chemical Inc.) |
| catalyst | Polycat 46 (Air Product Co.) |
| Silicon foam stabilizer A | B-8629 (TG. Gold-Schimidt Co.) |
| Silicon foam stabilizer B | B-8960 (TG. Gold-Schimidt Co.) |
| Silicon foam stabilizer C | B-8961 (TG. Gold-Schimidt Co.) |
| Blowing agent A | Water |
| Blowing agent B | HCFC-141b |
| Nuclear agent | Perfluorohexane (3M) |
| Cell opening agent | Calcium stearate (Samzeon Chemical Co.) |
| Polyisocyanate | Prepolymer obtained by the reaction of pMDI and triethlyeneglycol monomethylether, having a 25% of NCO% |

In here, PMDI and HCFC-141b means polymethylene polyphenyl polyisocynate and 1,1-dichloro 1-fluoroethane, respectively.

In these reference samples 1 to 3, the materials as indicated in Table 2 excluded the silicon foam stabilizer D which was used in the production process of rigid polyurethane foam. And an 100% open cell rigid polyurethane foam was obtained by a calcium stearate as a substitute cell opening agent. The thermal conductivity of the vacuum heat insulating material is indicated in Table 2.

TABLE 2

The formulation and properties of the open cell rigid polyurethane foam and properties of a vacuum heat insulating panel.

| | | EXAMPLES | | |
|---|---|---|---|---|
| | | 1 | 2 | 3 |
| Formulation (Parts by weight) | Polyether polyol | 100 | 100 | 100 |
| | Catalyst | 0.9 | 0.9 | 0.9 |
| | Silicon foam stabilizer A | 1.0 | — | — |
| | Silicon foam stabilizer B | — | 1.0 | — |
| | Silicon foam stabilizer C | 1.0 | — | 1.0 |
| | Blowing agent A | 1.5 | 1.5 | 1.5 |
| | Blowing agent B | 9.0 | 9.0 | 9.0 |
| | Nuclear agent | 4.0 | 4.0 | 4.0 |
| | Cell opening agent | 1.0 | 1.0 | 1.0 |
| | Polyisocyanate | 200.0 | 200.0 | 200.0 |
| | Isocyanate index | 170 | 170 | 170 |
| Properties of foam | Density (kg/m$^3$) | 55 | 56 | 55 |
| | Cell size (um) | 150 | 145 | 155 |
| | Cell openness (%) | 100 | 100 | 100 |
| Insulation efficiency of vacuum heat insulating material | Initial thermal conductivity (10$^{-4}$ kcal/mhr ° C.) | 65 | 60 | 70 |
| | Thermal conductivity after 30 days (10$^{-4}$ kcal/mhr ° C.) | 70 | 65 | 75 |

As above mentioned, even though the open cell rigid polyurethane foam of this resent invention does not include a close cell at all, the gas being contained in the cell wall of the foam diffuses gradually in the long-term base, and a very small amount of gas diffuses through an opening of heat adhering and metal-laminate film, so inner pressure increase and insulation efficiency of the vacuum heat insulator is remarkably decrease. To solve above-mentioned inner pressure increase problem, this present invention uses an inorganic gas absorber, which absorbs diffused gas and maintains inner vacuum condition over a long period (more than ten years) and maintains the initial heat insulating property.

What is claimed is:

1. An open cell rigid polyurethane foam comprising the reaction product of an organic isocyanate and a mixture comprising a polyol for producing rigid polyurethane foam, a volatile blowing agent, water, 0.1–5.0 parts by weight in relation to 100 parts by weight of the polyol of a foam stabilizer for cell opening, 0.1–5.0 parts by weight in relation to 100 parts by weight of the polyol of a foam stabilizer for producing rigid polyurethane and a cell opening agent in the presence of a catalyst, wherein the polyol is an addition product of alkyleneoxide and glycerin having a functionality of 3 and a hydroxy value of 200 to 350 mg KOH/g and the cell opening agent is aliphatic monohydric alcohol of 2 to 4 carbon atoms.

2. The open cell rigid polyurethane foam of claim 1 wherein the blowing agent is selected from the group consisting of hydrofluorocarbons of two to four carbons, perfluoroalkanes of four to six carbons, pentane, and cyclopentane and mixtures thereof.

3. The open cell rigid polyurethane foam of claim 2 wherein the hydrofluorocarbon is selected from the group consisting of 1,1,1,2-tetrafluoroethane, 1,1,2,2,3-pentafluoropropane, 1,1,1,2,3,3-hexafluoropropane and 1,1,1,4,4,4,-hexafluorobutane.

4. The open cell rigid polyurethane foam of claim 2 wherein the perfluoroalkane is selected from the group consisting of perfluoropentane and perfluorohexane.

5. The open cell rigid polyurethane foam of claim 2 wherein the amount of volatile blowing agent is in the range of 5~20 parts by weight in relation to 100 parts by weight of the polyol.

6. The open cell rigid polyurethane foam of claim 1 wherein the amount of water is in the range of 0.5~5.0 parts by weight in relation to 100 parts by weight of the polyol.

7. The open cell rigid polyurethane foam of claim 1 wherein the catalyst comprises isocyanate trimer catalyst selected from the group consisting of a metal salt of organic carbonic acid, a tertiary compound of amine and a quaternary salt of ammonium.

8. The open cell rigid polyurethane foam of claim 7 herein the isocyanate trimer catalyst is a mixture of more than one of catalysts in an amount of 0.5~5.0 parts by weight in relation to 100 parts by weight of the polyol.

9. The open cell rigid polyurethane foam of claim 1 wherein the amount of cell opening agent is in the range of 0.5~5.0 parts by weight in relation to 100 parts by weight of the polyol.

10. The open cell rigid polyurethane foam of claim 1 wherein the organic isocyanate is a prepolymer obtained by the reaction of a polymethylene polyphenyl polyisocyanate and an aliphatic monohydric alcohol or a mixture of said prepolymer and said polymethylene polyphenyl polyisocyanate.

11. The open cell rigid polyurethane foam of claim 10 wherein the amount of organic isocyanate is in the range of about 200 parts by weight in relation to 100 parts by weight of the polyol mixture containing water, and has a isocyanate value of 130 to 300.

12. A method for producing an open cell rigid polyurethane foam, comprising the steps of:

mixing a polyol for producing rigid polyurethane foam, a blowing agent, a cell opening agent, 0.1~5.0 parts by weight in relation to 100 parts by weight of the polyol of a foam stabilizer for cell opening, and 0.1~5.0 parts by weight in relation to 100 parts by weight of the polyol of a foam stabilizer for producing rigid polyurethane foam to form a mixture, wherein the polyol is an addition product of alkyleneoxide and glycerin having a functionality of 3 and a hydroxy value of 200 to 350 mg KOH/g and the cell opening agent is aliphatic monohydric alcohol of 2 to 4 carbon atoms; and reacting said mixture and an organic isocyanate.

13. A method for producing vacuum heat insulating panel, comprising the steps of:

mixing a polyol for producing rigid polyurethane foam, a volatile blowing agent, water, a cell opening agent, 0.1–5.0 parts by weight in relation to 100 parts by weight of the Dolyol of a foam stabilizer for cell opening, and 0.1–5.0 Parts by weight in relation to 100 parts by weight of the polyol of a foam stabilizer for producing a rigid polyurethane to form a mixture, wherein the polyol is an addition product of alkyleneoxide and glycerin having a functionality of 3 and a hydroxy value of 200 to 350 mg KOH/g and the cell opening agent is aliphatic monohydric alcohol of 2 to 4 carbon atoms;

reacting said mixture with an organic isocyanate in the presence of a catalyst, forming an open cell polyurethane foam; and, wrapping said open cell rigid polyurethane foam and a gas absorber with metal-laminate film, and vacuum sealing it.

* * * * *